Feb. 9, 1932.    I. ANDERSON ET AL    1,844,455
CULTIVATOR
Filed July 25, 1930    3 Sheets-Sheet 1
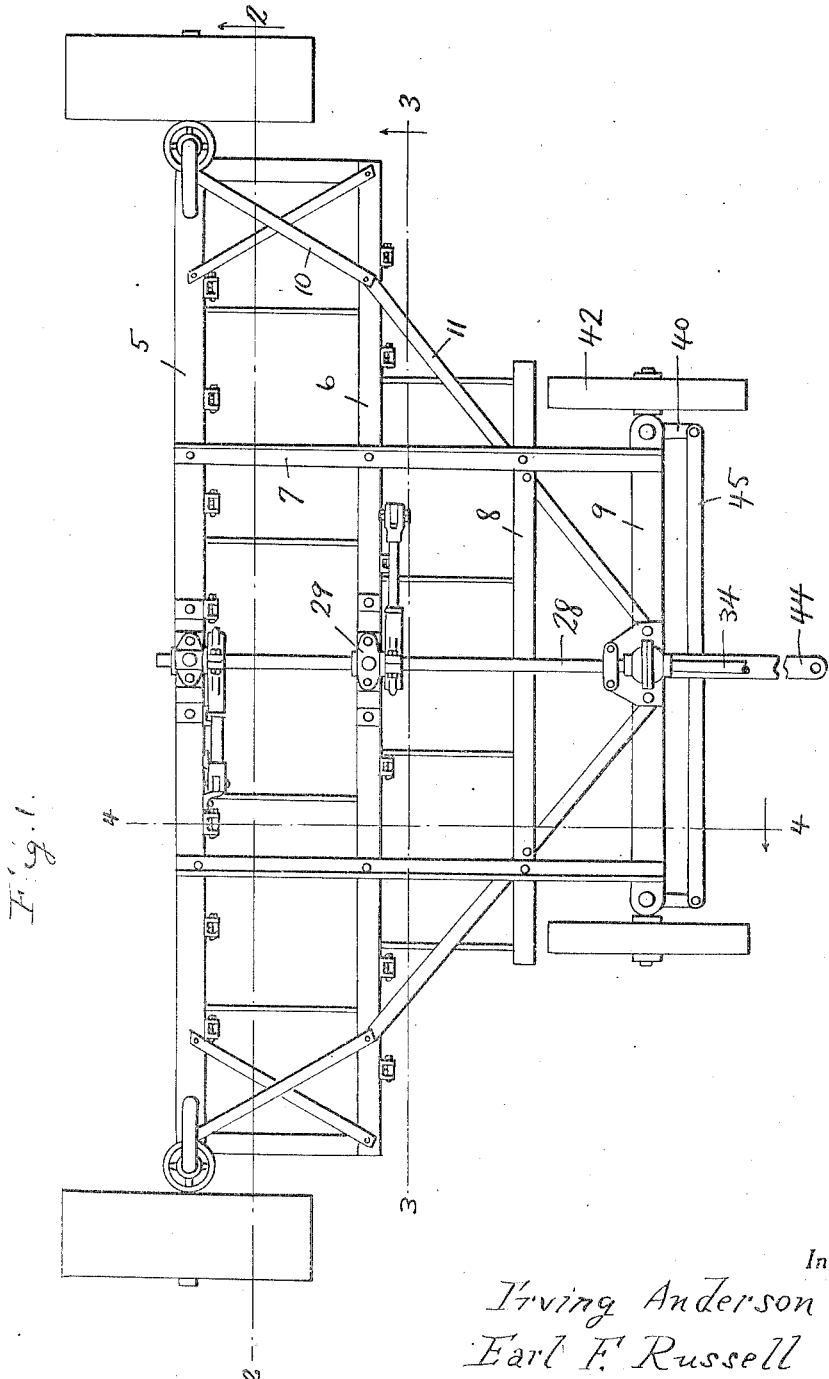
Inventor
*Irving Anderson*
*Earl F. Russell*
By *Clarence A. O'Brien*
Attorney

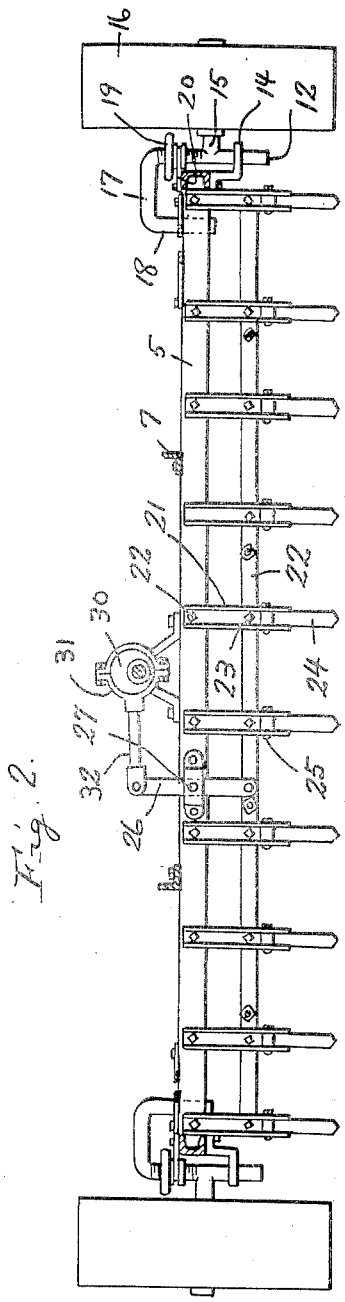
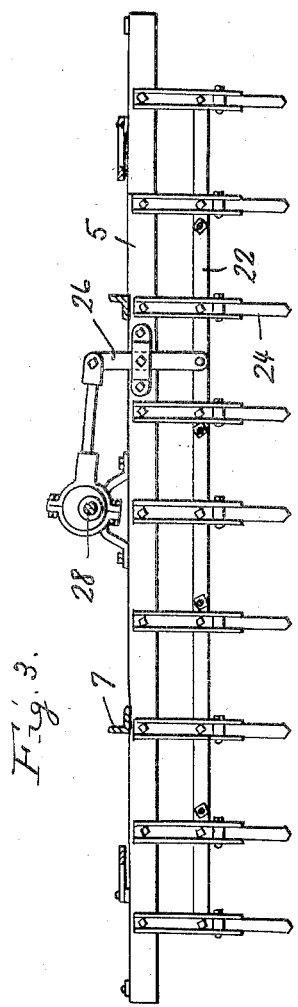

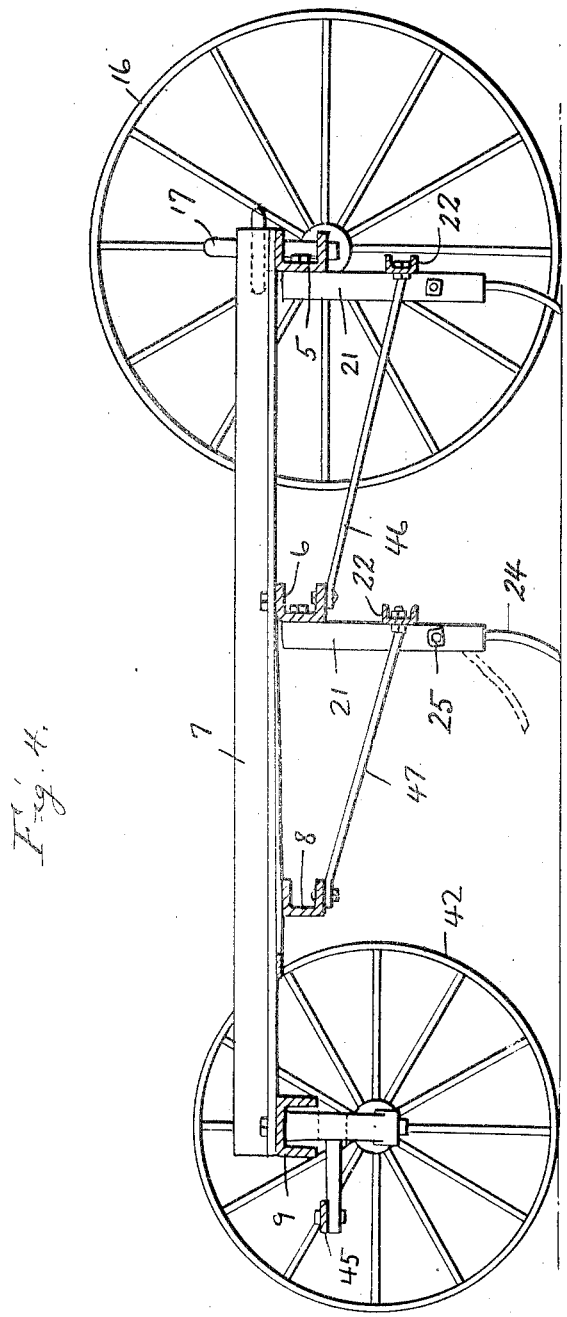

Patented Feb. 9, 1932

1,844,455

UNITED STATES PATENT OFFICE

IRVING ANDERSON AND EARL F. RUSSELL, OF BIRD CITY, KANSAS

CULTIVATOR

Application filed July 25, 1930. Serial No. 470,724.

The present invention relates to a cultivator and has for its prime object to provide a cultivator with shovels mounted and having means so that the shovels oscillate transversely of the cultivator frame during the operation thereof.

A still further very important object of the invention resides in the provision of a cultivator structure of this nature which is simple, strong and durable, compact and convenient in its arrangement of parts, adjustable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of a cultivator structure embodying the features of our invention, Figures 2 and 3 are vertical transverse sections taken substantially on the line 2—2 and 3—3 of Figure 1, Figure 4 is a longitudinal section taken substantially on the line 4—4 of Figure 1.

Referring to the drawings in detail it will be seen that the frame of the cultivator includes a pair of spaced transverse bars 5 and 6 with longitudinal bars 7 fixed to intermediate portions thereof equidistant from the center thereof and projecting forwardly of the bar 6 to support a transverse bar 8 and an axle bar 9. The bars 5 and 6 have cross braces 10 therebetween. Braces 11 are diagonally disposed and attached to bars 6, 8 and 9.

Rods 12 are slidable through brackets 14 on the ends of the bars 5 and have axles 15 projecting outwardly therefrom on which are journalled rear wheels 16. Inwardly disposed extensions 17 are formed on the rods 12 and terminate in depending portions 18 extending through openings in the bars 5. An annular member 19 is threaded on the upper portion of the bars 12 and is grooved to receive a plate 20 on the bar 5 so that by adjusting the member 19 the rear portion of the frame may be lowered and raised to the proper adjustment desired. Cultivator shovel shanks 21 are pivotally engaged as at 22 at their upper ends to the bars 5 and 6 to depend therefrom. The shanks 21 are connected by rods 22 pivotally engaged thereto as at 23.

Shovels or blades 24 are pivotally engaged as at 25 in the lower ends of the shovel shanks 21 so that they may brake forwardly as is indicated in Figure 4 but are prevented from braking rearwardly. Thus the shovels will be ineffective when the machine is backed up.

Rockers 26 are pivotally mounted intermediate their ends as at 27 on the bars 5 and are pivotally engaged with the rods 22. A shaft 28 is journalled in bearings 29 on the bars 5 and 6 and has eccentrics 30 thereon in rings 31 on links 32 pivotally connected with the upper ends of the rockers 26. The shaft 28 may be rotated by suitable shaft connection 34 with the tractor so that rotary motion may be imparted to the shaft 28 thereby oscillating the shovels and their shank transversely with respect to the machine.

Steering knuckles 40 are mounted on the ends of the axle 9 and have front wheels 42 journalled thereon. The tractor hitch is shown at 44. A connecting rod 45 is disposed between the steering knuckles 40. Braces 46 are disposed between the rear rod 22 and the bar 6 while similar braces 47 are disposed between the front rod 22 and the transverse bar 8. These rods 46 and 47 are of resilient or bendable material and are pivotally connected with the transverse bar.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

In a cultivator structure of the class described, a frame, a plurality of shovel shanks rockably mounted on the frame, and means for transversely rocking the shanks, said means including a shaft, eccentrics on the shaft, a ring on each eccentric, links connected with the rings, and rockers connected with the links and with the shanks.

In testimony whereof we affix our signatures.

IRVING ANDERSON.
EARL F. RUSSELL.